Nov. 17, 1936. J. VANORIO Re. 20,175

WATER HEATING APPARATUS FOR HOUSE HEATING SYSTEMS

Original Filed March 23, 1931 2 Sheets-Sheet 1

INVENTOR
BY Joseph Vanorio
Joseph F. O'Brien
His ATTORNEY

Nov. 17, 1936. J. VANORIO Re. 20,175
WATER HEATING APPARATUS FOR HOUSE HEATING SYSTEMS
Original Filed March 23, 1931 2 Sheets-Sheet 2
Fig. 3.
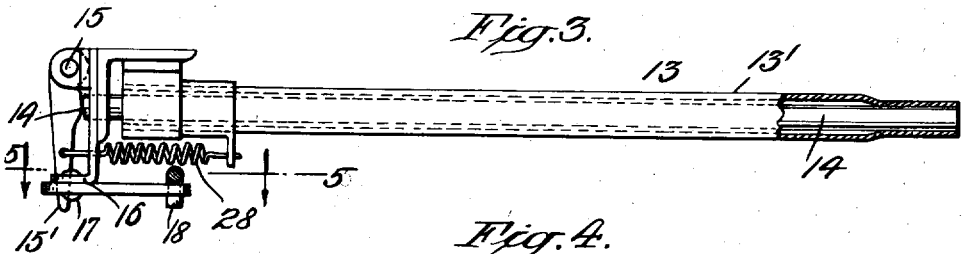
Fig. 4.
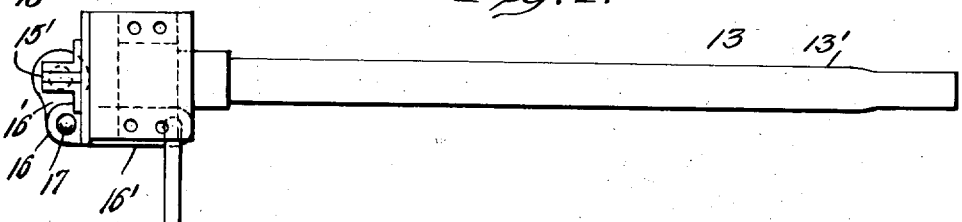
Fig. 5.
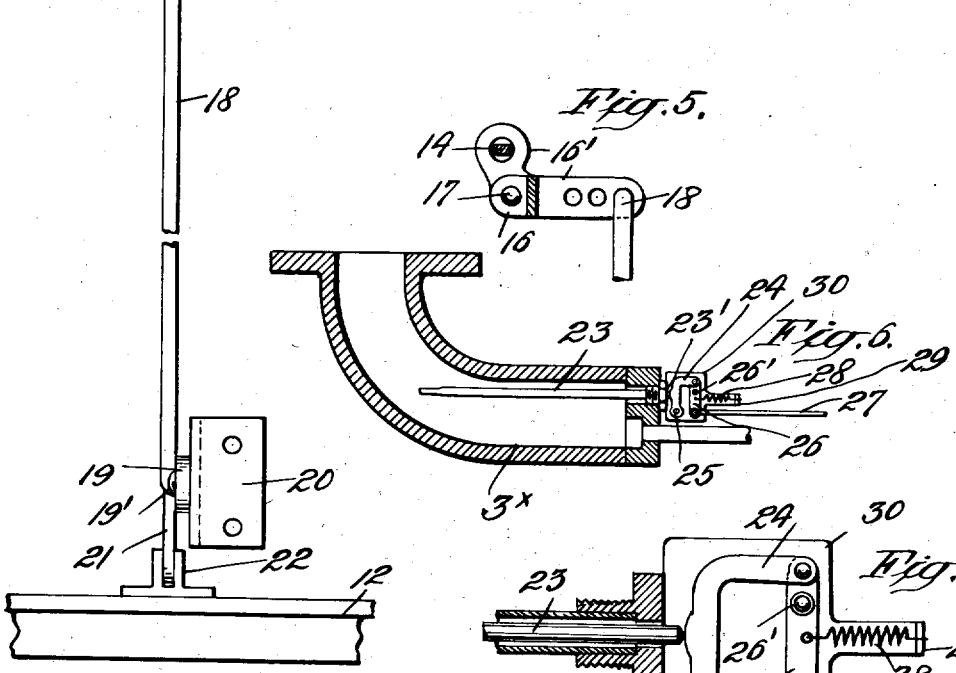
Fig. 6.
Fig. 7.
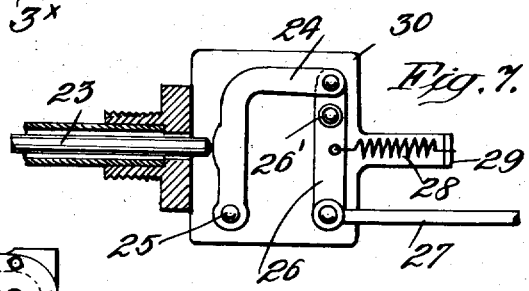
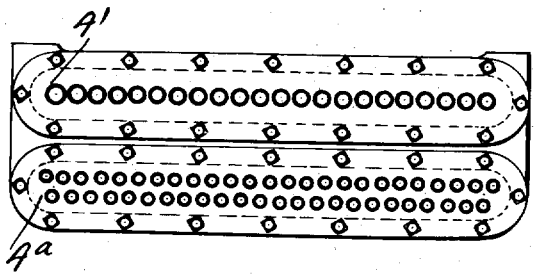
Fig. 2.
INVENTOR
BY Joseph Vanorio
Joseph F. O'Brien
His ATTORNEY Reissued Nov. 17, 1936 Re. 20,175

UNITED STATES PATENT OFFICE 20,175

WATER HEATING APPARATUS FOR HOUSE HEATING SYSTEMS

Joseph Vanorio, Mount Vernon, N. Y., assignor of one-fifth to Joseph F. O'Brien, Englewood, N. J.

Original No. 1,925,780, dated September 5, 1933, Serial No. 524,661, March 23, 1931. Application for reissue September 5, 1935, Serial No. 39,317

7 Claims. (Cl. 122—23)

This invention relates to water-heating apparatus for house-heating systems.

It is desirable in order to procure the highest efficiency in water-heating apparatus to utilize copper water tubes because of the high heat-conductivity thereof but owing to the fact that when stack temperatures run lower than 120° or thereabouts, condensation from the flue gases or "sweating" occurs on the copper tubing, it has heretofore been found impossible to utilize such copper tubing unless temperatures higher than 120° F. are maintained on the tubes with consequent great heat loss at the stack. This sweating of the tubes is not only destructive of the copper so as to greatly reduce the life or period of efficiency of the tubes but also tends to cause the production of deleterious and odoriferous gases and these facts have heretofore made it necessary that hot water heaters operate with high flue-temperatures and relatively short travel over the tubing of the gases of combustion. By my invention I am enabled in a water-heating apparatus, to utilize water-heating tubes of high heat conductivity metal such as copper and I am also enabled to greatly reduce the temperature of the flue gases at the stack while at the same time avoiding the danger of sweating and the formation of such deleterious and odoriferous gases.

Among the objects of this invention are the production of an apparatus which will be efficient, economical and compact and which will enable the economic utilization of such high conductivity metal in the water heating tube; which will initially heat the tubes to avoid "sweating" and will thereafter utilize to the maximum the products of fuel combustion; which will take advantage of a long travel of the flue gases but will maintain the heat in the flue at a temperature of approximately 120° F. so as to avoid sweating of the copper pipes which occurs when flue gases reach a point substantially below 120° F.; which will provide an apparatus having a plurality of flue sections containing copper water-heating tubes, one of which sections is shorter than the other in combination with temperature-controlled means preferably actuated either by the stream of the flue gases adjacent to the stack or in water header or drum adjacent to the outlet for controlling and changing the travel of the gases of combustion so as to cause the same to travel alternately through short and long flue sections containing copper water-heating tubes, initially travelling through a relatively short passage until danger of sweating is eliminated and then when the temperature on the flue or tubes reaches a predetermined degree, through a relatively long passage, thus enabling the temperature of the products of combustion or flue gases to be maintained after an initial starting period at a substantially constant level which will be low enough to greatly increase the elimination of heat loss at the stack but will be high enough to prevent condensation on the copper water tubing.

Still another object of my invention is to provide a water-heating apparatus with a flue in which the product of the combustion will travel in a path which will take advantage for a major portion of its length of the normal upward flow of the gases of combustion but will compel such gases to traverse a relatively short loop between a burner at the bottom of the apparatus and a discharge outlet at the top thereof, one leg of which looped path extends in an incline downwardly and thereafter extends in a generally upward path and to dispose water-heating pipes in said flue and to cause water to flow therethrough first in a downwardly-inclined direction and then in a generally upward direction, said water pipes being arranged to preheat water passing downwardly and to apply greater heat to the water moving upwardly, whereby I am enabled to position the flues and pipes in curves and paths that will be in substantially direct relationship to the intensity of the heat of the gases and the conductivity of heat by the copper pipes, while providing greatest velocity of water through the pipes adjacent to the burner and I am enabled also to utilize the natural tendency of gases of combustion and of the heated water to flow upwardly, thus maintaining the velocity of such gases and water at a rate of flow which will provide greatest efficiency while also taking advantage of the flow factors or the suction factors of generally upwardly-moving streams of gases and water and, furthermore, by the use of my plural section flue and temperature control therefor, I automatically cause the reducing or increasing of the flow of gases through the legs of the loop which constitutes a secondary flue and thus provide a less or greater flow of gases as may be required by combustion factors through the primary and secondary flues.

Still another object of my invention is, in a flue of the type under consideration to compel the gases of combustion to traverse a staggered path in such flue by suitable baffle plates.

With these and other objects in view the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 2 is a section on the line 2—2 of Fig. 1, looking in the direction of the arrow;

Fig. 3 is a detailed section of the thermostat-controlled mechanism employed by me for controlling the stack temperature of my water-heating apparatus;

Fig. 4 is a view in plan of the thermostat-controlled mechanism shown in Fig. 3;

Fig. 5 is a section on the line 5—5 of Fig. 3, looking in the direction of the arrow;

Fig. 6 is a view, in side elevation of a thermostat applied to a water conduit shown in section; and Fig. 7 is an enlarged detail view of a portion of the apparatus shown in Fig. 6.

Figure 1:
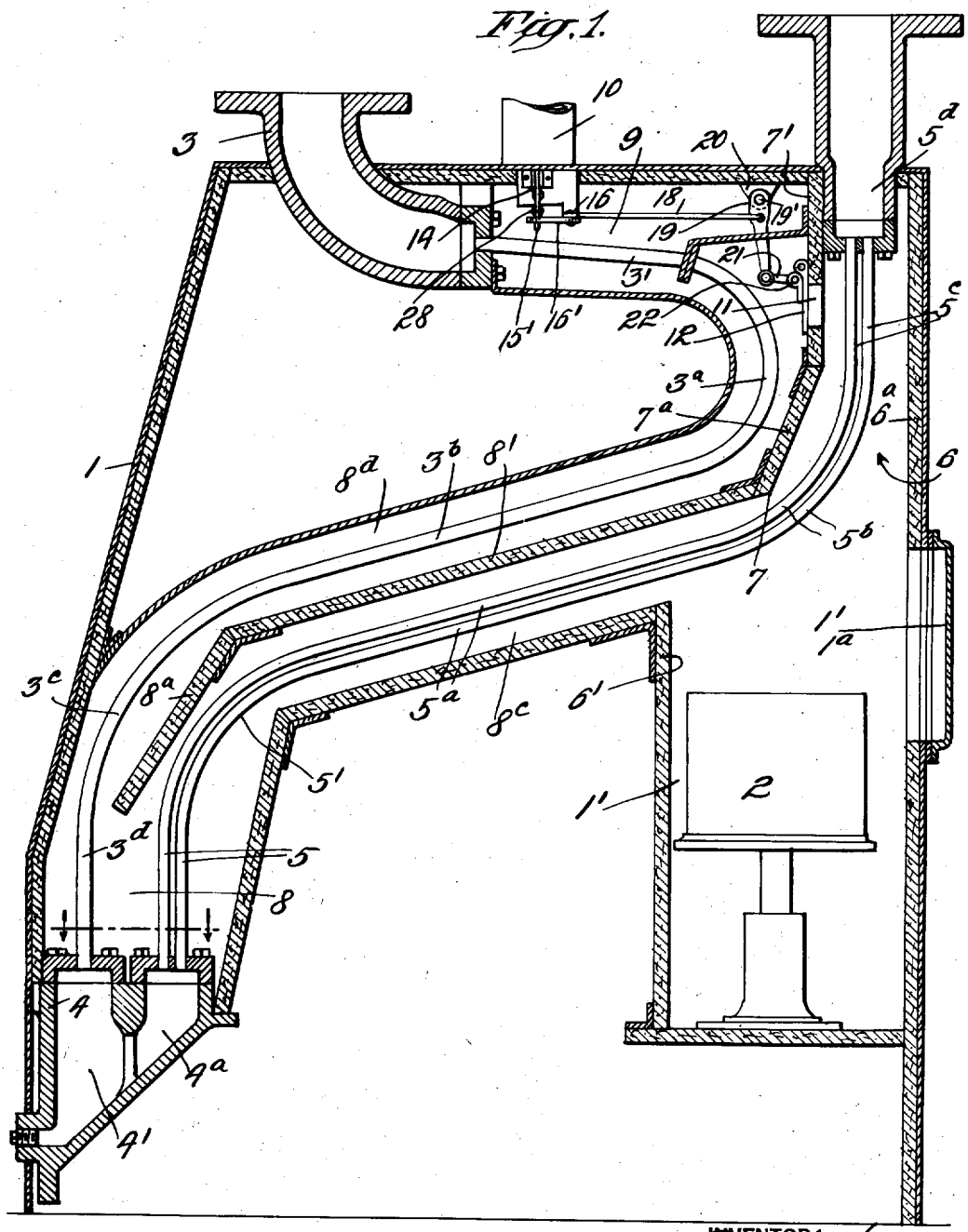
Fig. 1 is a cross section of a water-heating apparatus embodying my invention.

Referring now to these drawings, which illustrate a preferred embodiment of my invention, 1 indicates a heater casing or shell having at its front end a burner compartment or combustion chamber 1′ provided with a conventional door $1^a$ adjacent to the top of the burner and also provided with one or more burners 2 preferably for gas or oil, to which burners fuel is fed in any suitable manner not shown and 10 indicates a stack or outlet for the gases of combustion positioned, as illustrated, at the top of the casing.

Within the shell or casing 1, I provide directly above the combustion chamber 1′ an upper combustion-chamber section 6 divided, by means of a refractory partition 7 from a discharge-flue section 9 leading to the discharge stack 10. The partition 7 has a vertical portion 7′ and an inclined portion $7^a$ extending at a slightly inclined angle to the vertical. A plural-sectioned lateral flue 8 extends in a loop having, as shown, two sections, communicating at one end with each other, and one of said sections having its other end communicating with the combustion chamber 1′ and the other of said sections having its other end communicating with the discharge flue 9. As illustrated, the up and down sections of the plural or looped flue 8 are separated by refractory partition sections 8′, $8^a$, one end of which is connected to the partition 7 and the other end of which terminates in the bottom or loop end of the plural flue 8 to cause the gases to pass around the same in a loop. The partition 8′ extends at an angle slightly inclined to the horizontal. This flue is separated into up and down sections $8^c$, $8^d$ by partition sections 8′, $8^a$ terminating with the portion $8^a$ which extends downwardly from the portion 8′ at a slight angle to the vertical, this partition dividing the lateral flue chamber 8 into a loop-shaped flue having sections extending laterally from the combustion chamber at an angle of approximately 20° to the horizontal, thence at its end dipping toward the rear bottom of the casing 1 to a position adjacent to the corner formed between the rear wall and bottom of said casing 1. The combustion chamber is composed of two sections one of which may be termed the lower combustion-chamber section 1′ and the other an upper combustion-chamber 6 extending to the upper front portion of the casing 1. In the preferred embodiment of my invention shown, I provide between the upper combustion-chamber section 6 and the discharge flue 9 a valve opening 11 which is controlled by a valve 12 maintained in open position at the start of the operation of the boiler to pass the products of combustion from the combustion-chamber section 6 directly to the flue section 9 at the start of operation and thus to cause the hot gases of combustion to pass from the combustion-chamber section 6 through the by-pass 11 and through the flue section 9 to the stack 10, thereby, in such starting operation, providing the high temperature gases necessary to prevent "sweating" of the tubes and this movement or operation of the gases of combustion is continued usually for a short period of time until the gases in the discharge flue 9 reach a degree of temperature above a predetermined degree and preferably above 120° F., whereupon a heat-actuated device or thermostat will close or partially close the valve 12 in accordance with the rise in temperature, thus causing the gases of combustion to traverse the two legs of the longer lateral flue 8 to the discharge flue 9 and stack 10. The downwardly-inclined loop-shaped flue-sections $8^c$, $8^d$ increases the length of extent of travel of the gases and enables the efficient absorption of the heat from such gases as will now be explained.

The casing 1 also, as illustrated, is provided at the upper end with a water inlet through a top boiler-section or upper-head 3 positioned adjacent to the discharge flue 9 at the rear of the stack 10 and with which is connected a single series of tubes 3′ formed of metal, such as copper, of high heat conductivity. These tubes extend through the discharge flue 9 in a substantially horizontal direction toward the combustion-chamber 1 at the front end of the casing 1 and are then provided with a wide reverse curve or loop $3^a$ which merges with a portion $3^b$ extending downwardly through the up-flue section $8^d$ of the lateral flue 8 at an angle of approximately 20° to the horizontal, which in turn merges with a downwardly-curved portion $3^c$ which at its end is connected to a header, drum or boiler section 4 preferably having communicating sections 4′, $4^a$ and mounted at the corner formed between the rear wall and bottom of the casing 1. Leading from the section $4^a$ and extending first in a substantially vertical direction is a double series of pipes 5 merging by means of a relatively wide curved portion 5′ with an upwardly-inclined portion $5^a$ passing through the down-flue section $8^c$ of the lateral flue 8 and these tube portions in turn merge by means of a wide curve $5^b$ with a vertical portion $5^c$ which in turn is connected to an outlet boiler section or top header $5^d$, which header 5 is mounted at the top of the casing adjacent to the front thereof and is connected with the heating system of the house to be heated.

I have provided a wide curve at $5^b$ so as to enable the water in the said tubes of high conductivity metal to move at high velocity through this portion or section so as to enable the maximum absorption by the water at this section of the heat of the gases of combustion, and to take advantage of the natural tendency of the heated water to move upwardly. The wide curves at 5′, $3^c$ and $3^a$ are made so as to avoid retardation of the water therethrough and also to enable a maximum of absorption of heat of gases at these points.

It will be apparent that the gases of combustion in such travel, will bathe the tube sections $5^a$, 5′, 5, $3^d$, $3^c$, $3^b$, $3^a$ and 3′ until the same is discharged at the stack 10. In the event that the temperature in the section 9 is at any time reduced below 120° the thermostatic element will automatically open the valve to again cause the hot gases of combustion to be by-passed through the opening 11 directly into the section 9.

In the preferred embodiment of my invention illustrated in Fig. 1, the thermostatic device comprises a thermostat 13 (Fig. 1) embodying, as shown, a heat-sensitive element 14 suitably mounted in the tube 13′ and abutting at its opposite end a lever 14 pivoted at 15 and having its end 15′ connected with one arm 16′ of a bell crank lever 16 pivoted at 17 and having its arm 16ᵃ connected with a rod 18 connected intermediate the ends of the lever 19 pivoted at 19′ on a bracket 20 and connected at its other end with one end of a link 21, the other end of which is pivoted by means of a bracket 22 to the valve.

In Figs. 7 and 8 I have shown another modified form of temperature controlling element for actuating the valve 12. In these figures, the thermostat member 23 is extended within a modified top water section 3ˣ and has its end 23′ arranged to rock a bell crank 24 pivoted at 25 which in turn rocks a straight lever 26 pivoted at 26′ and having an arm connected to a rod 27 which in turn is connected to the valve in the manner hereinabove described, the lever 24 being held in abutment with the thermostatic member by means of a spring 28 stretched between the lug 29 on the mounting plate 30 and an intermediate point of said lever.

From the above, it will be seen that upon igniting the burner or burners the gases of combustion will first pass through the lower combustion-chamber section 1′, then through the upper section 6 having on such passage direct access or impingement against the widely-curved portion 5ᵇ and the vertical portion 5ᶜ, and will thence pass through the open valve opening 11 and into the flue section 9 and through the stack 10. During passage of these gases in this way, the hot gases will only come into contact with the end of the double series of tubes 5ᵇ, 5ᶜ and with the beginning portion of the tubes 3′ and will very rapidly heat the flue chamber 9 so as to cause the same to reach a temperature above the predetermined temperature hereinabove specified of 120°. During this heating, the water in the tubes will absorb some of the heat and flow through the lateral looped flue 8. The water passing through the tube sections 5ᵇ and 5ᶜ will rapidly reach a relatively high temperature. During this starting period, however, the apparatus will be operating at a high stack temperature and with relative inefficiency and there will be a relatively high heat loss through the stack. So soon, however, as the heat in the flue section 9 reaches a predetermined temperature the thremostatic element 13 will operate to close or partially close the valve 12 so as to cause the whole or part of the gases of combustion to traverse the lateral looped flue 8 and thereafter the temperature of the gases discharged through the stack 10 will be greatly reduced. During such travel through the downwardly-inclined section 8ᶜ of the lateral looped flue 8, the double series of pipes 5 will be bathed in the hot gases and water therein will be caused to flow upwardly while the upward flowing of the gases through the flue section 8ᵈ will cause the water passing through the tube sections 3ᵇ, 3ᵃ and 3′ to be preheated. The water in these tubes 3ᵇ, 3ᵃ and 3′ will be caused to flow downwardly because of the suction produced by the upward flow in the tubes 5 and particularly in the sections 5ᵃ, 5ᵇ and 5ᶜ and in this manner I take advantage of the normal upward flow of the gases and by providing double the number of tubes in the upwardly flowing tube series, I further increase the velocity and natural upward flow of the water.

Having described my invention, I claim:

1. Water-heating apparatus embodying, in combination, a casing having a combustion chamber provided with an enclosed vertically-disposed extension portion, a burner within said combustion chamber, a gas outlet at the top of said casing, a flue having a gas-receiving end communicating with said combustion chamber above said burner, and provided with intermediate portions extending from said gas-receiving end rearwardly and forwardly and having its gas-discharge end communicating with said gas outlet, and copper water tubes having an inlet portion at the top of the casing adjacent to the discharge end of said flue, extending through said flue and the communicating vertical extension of said combustion chamber and provided with an outlet portion disposed vertically adjacent to the top of the casing, said water tubes at the portion thereof disposed at the gas-receiving end of said looped flue and in the vertical extension of the combustion chamber having a wide upwardly-disposed curve to provide a convection-circulation of increased velocity.

2. Water-heating apparatus embodying, in combination, a casing having a combustion chamber provided with an enclosed vertically-disposed extension portion, a burner within said combustion chamber, a gas outlet at the top of said casing, a flue having a gas-receiving end communicating with said combustion chamber above said burner, and provided with intermediate portions extending from said gas-receiving end first in a downwardly and rearwardly inclined direction and thence in an upwardly and forwardly inclined direction and having its gas-discharge end communicating with said gas outlet, and copper water tubes having an inlet portion at the top of the casing adjacent to the discharge end of said flue extending through said flue and the communicating vertical extension of said combustion chamber and provided with an outlet portion disposed vertically adjacent to the top of the casing, said water tubes at the portion thereof disposed at the gas-receiving end of said looped flue and in the vertical extension of the combustion chamber having a wide, upwardly-disposed curve to provide a convection-circulation of increased velocity.

3. Water-heating apparatus embodying, in combination, a casing having a combustion chamber provided with an enclosed vertically-disposed extension portion, a burner within said combustion chamber, a gas outlet at the top of said casing, a flue having a gas-receiving end communicating with said combustion chamber above said burner, and provided with intermediate portions extending from said gas-receiving end rearwardly and forwardly and having its gas-discharge end communicating with said gas outlet, copper water tubes having an inlet portion at the top of the casing adjacent to the discharge end of said flue, extending through said flue and the communicating vertical extension of said combustion chamber and provided with an outlet portion disposed vertically adjacent to the top of the casing, said water tubes at the portion thereof disposed at the gas-receiving end of said looped flue and in the vertical extension of the combustion chamber having a wide, upwardly-disposed curve to provide a convection-circulation of increased velocity, a thermostat, a valve openable to permit direct communication between the enclosed combustion chamber extension and discharge end portion of said flue when the temperatures operating said thermostat drop below a predetermined degree, and closable to compel passage of the gases through the looped flue when the temperature operating the said thermostat is raised above a predetermined degree.

4. Water-heating apparatus embodying, in combination, a casing provided with a combustion chamber and having a combustion gas outlet spaced from said combustion chamber, a partition separating said gas outlet from said combustion chamber and having a by-pass opening, a flue having a by-pass flue section communicating at its outer end with the gas-discharge outlet and at its inner end with said by-pass opening to provide a relatively short gas-discharge passage between the combustion chamber and the gas outlet, said flue also having a relatively long gas-receiving section provided with an end communicating with the inner end of said by-pass section, an intermediate tortuous portion and having its opposite end communicating with said combustion chamber, a burner within said combustion chamber, copper water-tubes having an inlet section disposed in the by-pass section of said flue, another portion extending through said intermediate tortuous flue and provided with an outlet portion extending through the gas-receiving end of said tortuous flue, a thermostat, a valve in said by-pass opening openable when the temperatures operating said thermostat drop below a predetermined degree to permit direct communication between the combustion chamber and the by-pass section of the said flue and closable to compel passage of the gases through the intermediate tortuous flue portion when the temperatures operating the said thermostat are raised above a predetermined degree, whereby the incoming cold water in the inlet section of said water tubes will, during the starting operation, be pre-heated and sweating of the water tubes in the longer flue section will be prevented.

5. Water-heating apparatus embodying, in combination, a casing provided with a combustion chamber and having a combustion gas outlet spaced from said combustion chamber, a partition separating said gas outlet from said combustion chamber and having a by-pass opening, a flue having a by-pass flue section communicating at its outer end with the gas-discharge outlet and at its inner end with said by-pass opening to provide a relatively short gas-discharge passage between the combustion chamber and the gas outlet, said flue also having a relatively long gas-receiving section provided with an end communicating with the inner end of said by-pass section, an intermediate tortuous portion and having its opposite end communicating with said combustion chamber, a burner within said combustion chamber, copper water-tubes having an inlet section disposed in the by-pass section of said flue, an intermediate portion extending through said intermediate tortuous flue and provided with an outlet portion extending through the gas-receiving end of said tortuous flue and also extending in an upward direction through said combustion chamber above said burner, a thermostat, a valve in said by-pass opening openable when the temperatures operating said thermostat drop below a predetermined degree to permit direct communication between the combustion chamber and the said by-pass section of the said flue and closable to compel passage of the gases through the intermediate tortuous flue portion when the temperature operating the said thermostat is raised above a predetermined degree, whereby the incoming cold water in the inlet section of said water tubes will, during the starting operation, be pre-heated and sweating of the water tubes in the longer flue section will be prevented and convection-circulation of increased velocity is obtained.

6. Water-heating apparatus, embodying, in combination, a casing provided with a combustion chamber, a gas outlet for the products of combustion, a flue having a gas-receiving end communicating with said combustion chamber and provided with a tortuous intermediate portion communicating with said gas-receiving end and having a gas-discharge end-portion communicating with said gas outlet and normally separated from said combustion chamber, a burner within said combustion chamber, copper water-tubes having an inlet portion disposed in the gas-discharge end-portion of said flue, an intermediate portion extending through said intermediate tortuous flue and provided with an outlet portion extending through the gas-receiving end of said flue and through said combustion chamber above said burner, said water tubes at the portion thereof disposed at the gas-receiving end of said tortuous flue and in the combustion chamber having a wide, upwardly-disposed curve to provide a convection-circulation of increased velocity.

7. Water-heating apparatus embodying, in combination, a casing provided with a combustion chamber, a gas outlet for the products of combustion, a flue having a gas-receiving end communicating with said combustion chamber and provided with a tortuous intermediate portion communicating with said gas-receiving end and having a gas-discharge end-portion communicating with said gas outlet and normally separated from said combustion chamber, a burner within said combustion chamber, copper water-tubes having an inlet portion disposed in the gas-discharge end-portion of said flue, an intermediate portion extending through said intermediate tortuous flue and provided with an outlet portion extending through the gas-receiving end of said flue and through said combustion chamber above said burner, said water-tubes at the portion thereof disposed at the gas-receiving end of said tortuous flue and in the combustion chamber having a wide, upwardly-disposed curve to provide a convection-circulation of increased velocity, a thermostat, a valve openable to permit direct communication between the combustion chamber and the gas-discharge end-portion of said flue when the temperatures operating said thermostat drop below a predetermined degree and closable to compel passage of the gases through the intermediate tortuous flue portion when the temperature operating the said thermostat is raised above a predetermined degree.

JOSEPH VANORIO.